No. 647,403. Patented Apr. 10, 1900.
P. D. HARTON.
MACHINE FOR ICING OR COATING CAKES.
(Application filed May 8, 1899.)
(No Model.) 4 Sheets—Sheet 4.
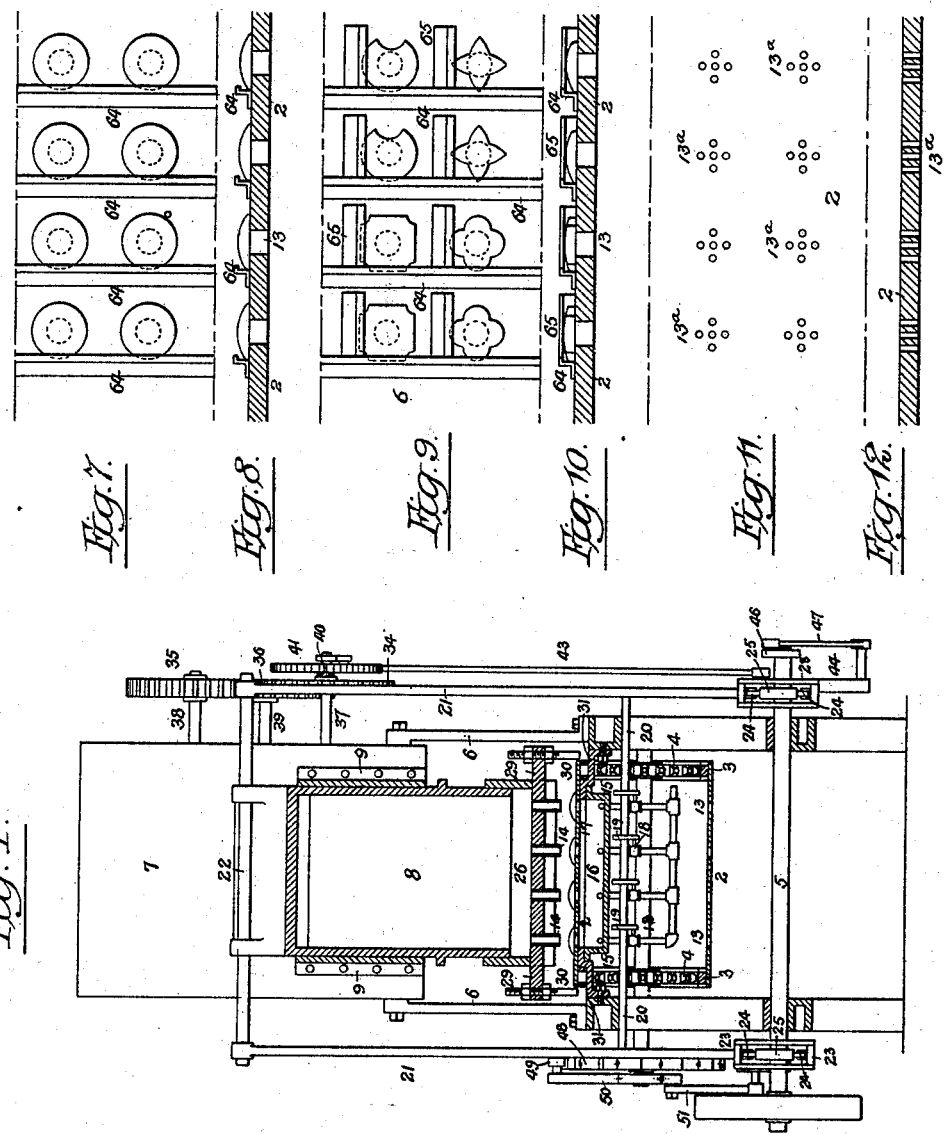
Witnesses:—
Inventor:—
Pembroke D. Harton.
By his Attorneys:—

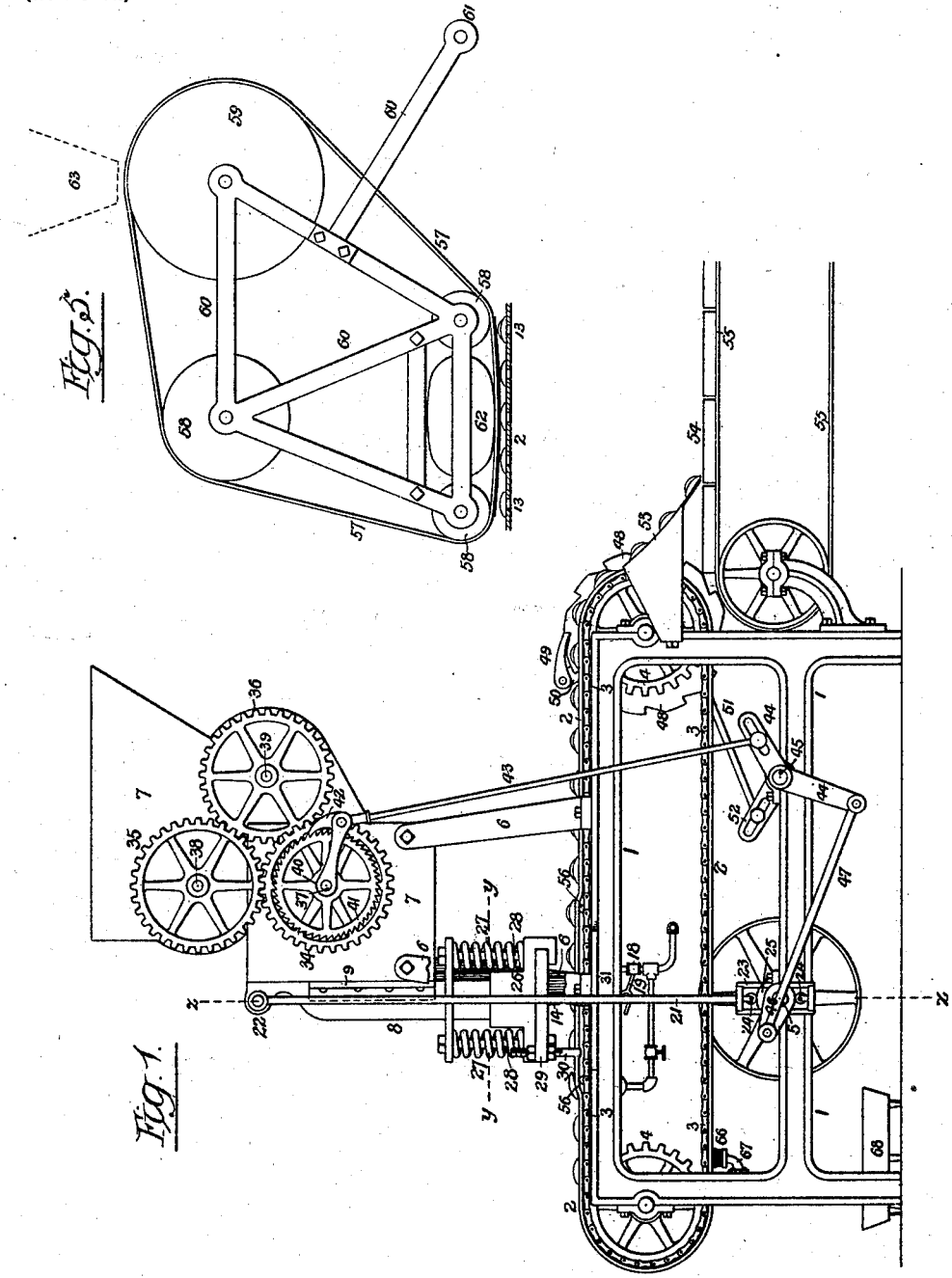

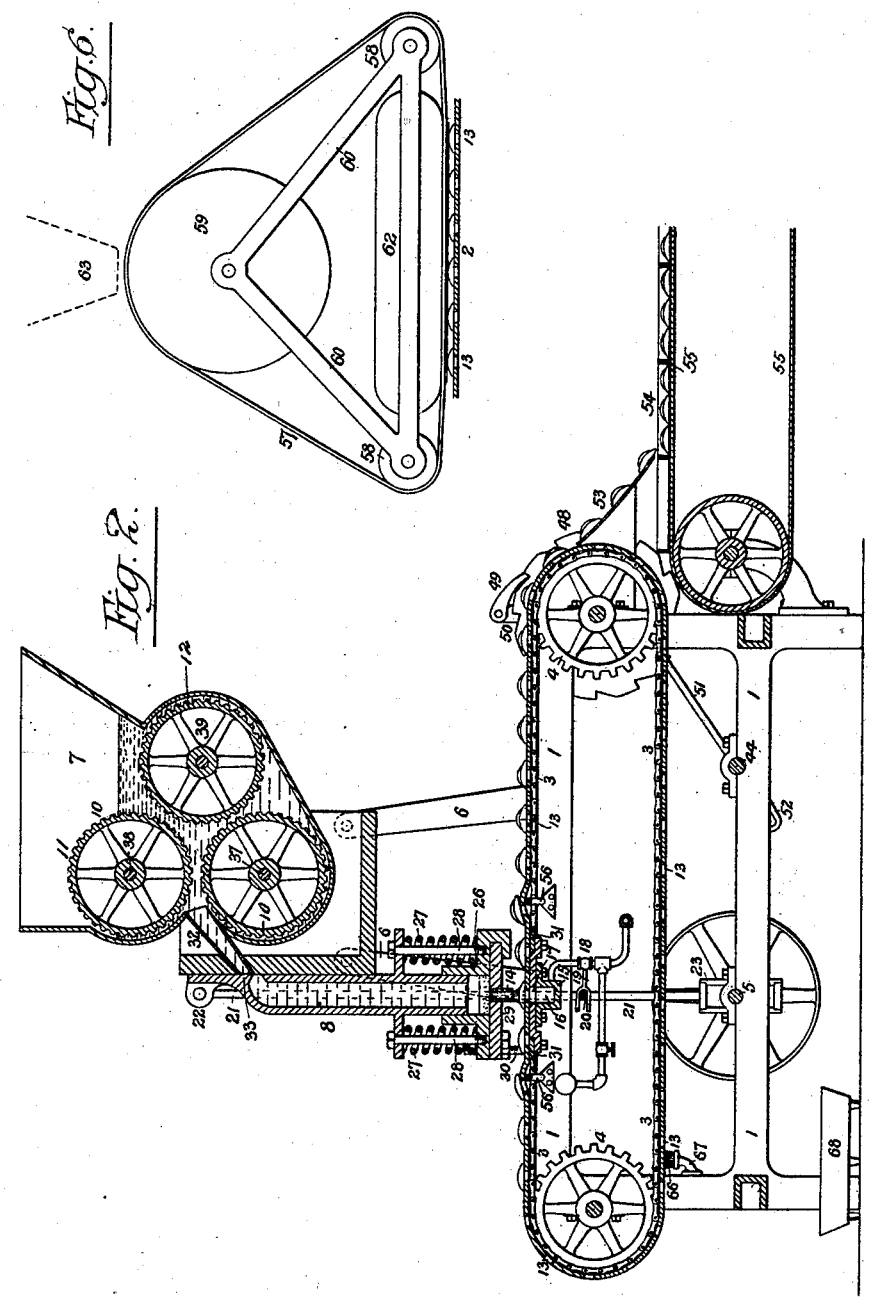

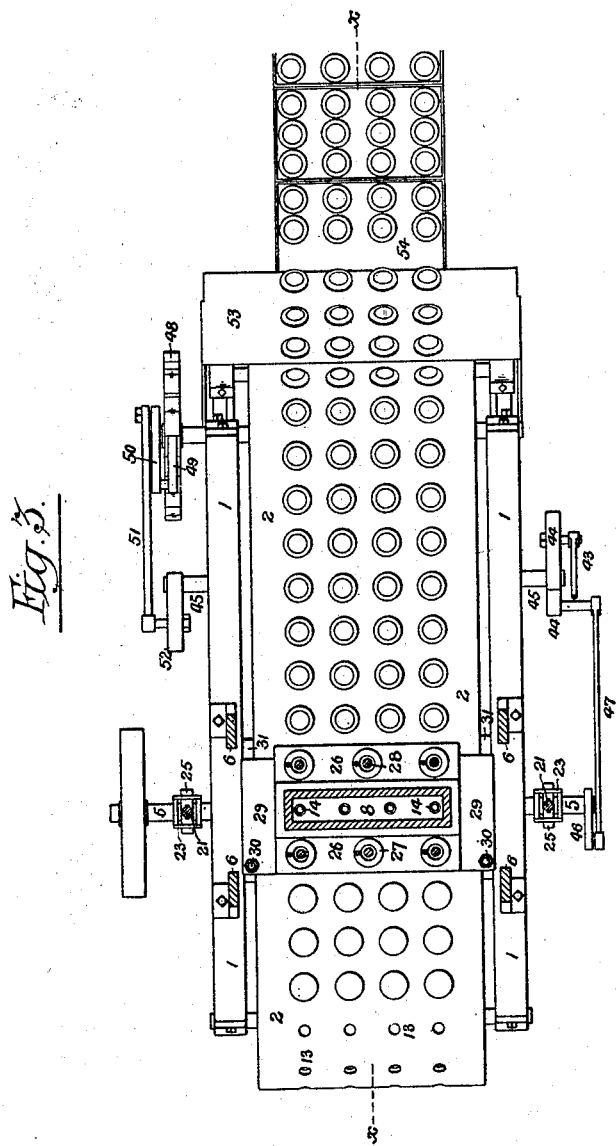

UNITED STATES PATENT OFFICE.

PEMBROKE D. HARTON, OF PHILADELPHIA, PENNSYLVANIA.

MACHINE FOR ICING OR COATING CAKES.

SPECIFICATION forming part of Letters Patent No. 647,403, dated April 10, 1900.

Application filed May 8, 1899. Serial No. 715,994. (No model.)

*To all whom it may concern:*

Be it known that I, PEMBROKE D. HARTON, a citizen of the United States, residing in Philadelphia, Pennsylvania, have invented certain Improvements in Machines for Icing or Coating Cakes, of which the following is a specification.

My invention relates to the art of icing or coating small cakes, cookies, crackers, and the like or the placing on the same of jelly or other sweetmeat of a plastic and viscid nature, which is usually of such consistency that it tends to smear when placed on the cakes in the ordinary manner.

My invention comprises a machine for coating the cakes or crackers with icing or other material in such manner that a uniform quantity of the icing or other material will be deposited in the center of each cake, a further object of my invention being to provide means for breaking quickly the connection between the icing or other material on the cake and that from the source of supply, so that the cakes when coated will present a relatively smooth and pleasing appearance.

My invention comprises other details, which will be more fully described hereinafter.

In the accompanying drawings, Figure 1 is a side elevation of a machine embodying my invention. Fig. 2 is a longitudinal sectional view of the same on the line $x\,x$, Fig. 3. Fig. 3 is a plan view, partly in section, taken on the line $y\,y$, Fig. 1. Fig. 4 is a sectional end elevation of the machine on the line $z\,z$, Fig. 1. Figs. 5 and 6 are views of modified forms of mechanism for applying the coating mixture to the cakes; and Figs. 7 to 12, inclusive, show views of modified forms of the carrying-belt.

In carrying out my invention I provide an endless belt, upon which the cakes rest, which is traversed in the machine in a suitable manner to bring the cakes under the feeding-head of the machine to receive the icing or other material with which they are to be coated. This belt is carried and driven by sprocket-wheels arranged at the opposite ends of a suitable frame, the movement of these wheels being so timed that the belt is given an intermittent forward movement, being stopped for a sufficient length of time when a row of cakes is under the feeding-head for the deposition of the icing or other material on the same, provision being made for holding the cakes to the belt during the coating operation, so that the connection between the icing or other material on the cakes and that in the feeding-head may be broken quickly without smearing the cake.

In the drawings herewith, 1 1 represent the side frames of the machine.

2 is the carrying-belt for the cakes, secured in any suitable manner to sprocket-chains 3 at the sides of the same, which are adapted to the sprocket-wheels 4 4 for driving the belt, said sprocket-wheels being adapted to suitable bearings at the ends of the side frames of the machine.

5 is the main driving-shaft, mounted in suitable bearings secured to the lower portion of the side frames 1. Mounted on suitable supports 6, secured to the frame of the machine and located above the carrying-belt, is the reservoir 7 for the icing or other material with which the cakes are to be coated, and adapted to the front of this reservoir 7 is a sliding and telescoping feeding-head 8, moving in guides 9, secured to the front of the reservoir. Located within said reservoir are a series of grooved feed-rolls 10, 11, and 12.

The carrying-belt is moved, the feeding-head is reciprocated up and down, and the feed-rolls inside the icing-reservoir are all operated from the main driving-shaft in a manner to be more fully described hereinafter.

The cakes or crackers to be iced are fed from any suitable receptacle onto the carrying-belt 2, which is provided with a series of perforations 13, disposed at regular intervals, and the cakes carried by the belt are adapted to rest over these perforations. The cakes are carried by this belt in successive periods of motion and rest, the rest occurring when one of the rows of cakes is directly under the feeding-head of the icing-reservoir. When a row of cakes reaches this point, the belt stops temporarily and the feeding-head 8 descends until the discharge-tubes 14, carried by the same, are directly over the cakes carried by the belt. The feeding-head is filled with the icing or other material with which it is desired to coat the cakes, and as soon as the ends of the discharge-tubes touch the same the icing or other material carried therein will adhere to the cakes and will be held by cohesive force. The coating having been placed on one row of cakes, the feeding-head is raised, so that the next row of cakes may be brought into position to be coated. The coating being of a very sticky consistency, the natural tendency is for the discharge-spouts to lift the cakes with them when the feeding-head is raised. To prevent this, I provide special means for holding the cakes in engagement with the carrying-belt as they are coated and as the feeding-head is raised.

Located beneath the belt 2 and secured to the side frames of the machine is a casing 15, forming a vacuum-chamber 16, in communication with any suitable exhaust apparatus. In the top 17 of this casing a series of openings are arranged adapted to register with the perforations in the carrying-belt 2, or a single opening the width of the machine may be made in the top of the casing. The exhausting of the air from the chamber 16 is controlled by a series of valves 18, located in front of the vacuum-chamber, having operating-handles 19, connected together by a transverse bar 20. This bar is secured to the vertical rods 21, which are connected to the feeding-head 8 and move the same up and down, receiving their motion from cams carried by the main driving-shaft 5. As the feeding-head descends to bring the discharge-tubes 14 into position to eject the material to coat the cakes the valves 18 are opened, the air is exhausted from the vacuum-chamber 16, and the belt and cakes carried thereby are securely held to the casing of the vacuum-chamber. The valves are so arranged that they will remain open until the feed-spout has almost reached its limit of upward movement, and the cakes being held to the belt by the vacuum in the chamber 16 the connection between the coating on the cakes and the material in the feeding-head will be broken. When the feeding-head reaches its full height, the valves are closed to the exhaust. The vacuum-chamber is open to the atmosphere. The belt is then freed from its contact with the casing of the same and can be moved forward to bring the next row of cakes on the same in the proper position beneath the feeding-head to be coated.

The rods 21 for moving the feeding-head 8 are secured to the same at 22 and carry a guide-yoke 23 at their lower ends, having rollers 24, adapted to be engaged by the cams 25 on the main driving-shaft 5, by which means the feeding-head is raised and lowered.

At the lower part of the feeding-head 8 is a telescoping portion 26 to facilitate the coating of the cakes. This telescoping portion is held in its normal position by means of coiled springs 27, surrounding the bolts 28, which serve to connect the portion 26 with the feed-spout 8. A plate 29, carrying the discharge-tubes 14, is removably secured to the telescoping portion 26—removable, so that a plate having larger or smaller discharge-tubes, depending upon the size of the cakes to be operated upon, may be substituted therefor. These plates are preferably provided with adjustable pins 30, adapted to strike plates 31, arranged at the sides of the machine, and limit the downward movement of the telescoping portion 26, so that the material carried by the feeding-head will be ejected through the discharge-tubes 14 onto the cakes.

The feeding-head is reciprocated up and down in front of the icing-reservoir 7, being adapted to guides 9, carried thereby. A passage 32 for the delivery of the material in the reservoir to the feeding-head is open when said head is in the raised position, and the material readily flows into the same. The amount of material passing into the feeding-head each time it is raised is proportioned to the amount ejected by the discharge-tubes when the feeding-head is lowered, so that said head is always provided with a sufficient quantity of material to properly coat the cakes. When the feeding-head descends, the connection between the material in the same and that in the reservoir 7 is cut off by the portion 33 of the feeding-head, which covers the end of the passage 32 when said head is in the lowered position.

Arranged inside the icing-receptacle 7 are the feed-rolls 10, 11, and 12 for feeding the icing or other material with which the cakes are to be coated to the delivery-passage 32, and these rolls are preferably grooved, as shown, so that the material will be positively fed into said passage. These feed-rolls are geared together on the outside of the reservoir by the gear-wheels 34, 35, and 36, and shafts 37, 38, and 39, serving to carry both the feed-rolls and the gear-wheels for operating the same, are mounted in suitable bearings secured to the sides of the reservoir 7. Gear-wheel 34 is the one from which the others are driven. On the hub 40 of this wheel a ratchet-wheel 41 is mounted, and in engagement with this ratchet-wheel is a pawl 42, actuated by a rod 43, connected to one arm of a bell-crank lever 44, mounted on a rock-shaft 45, which receives its motion from the main driving-shaft 5 through the medium of the crank-arm 46, carried by the same, and the link 47, which is connected to the other end of the bell-crank lever 44. The feed-rolls are operated as the belt is moved forward when the feeding-head is in the elevated position, and the amount of the coating mixture delivered to the feed-spout just equals the amount previously ejected onto the row of cakes last coated.

To give the carrying-belt 2 the intermittent movement, a ratchet-wheel 48 is mounted on the hub of one of the front sprocket-wheels 4, and in engagement with this ratchet-wheel is a pawl 49, carried by an arm 50, pivoted to the hub of said sprocket-wheel and operated by a link 51 from an arm 52, carried at the opposite end of the rock-shaft 45. Every revolution of the main driving-shaft moves the belt along the distance of one tooth of the ratchet-wheel 48, the notches forming the teeth of this wheel being spaced apart the same distance as the openings 13 in the carrying-belt over which the cakes rest, so that rows of cakes will always register with the discharge-tubes of the feeding-head.

When the coated cakes reach the end of horizontal travel of the carrying-belt 2, they drop onto an inclined way 53, from which they pass into trays or boxes 54, carried by an endless belt 55, by which the cakes are conveyed away to be dried, packed, and stored.

To reduce as much as possible the wear and tear of the carrying-belt consequent upon its intermittent connection with the casing of the vacuum-chamber, I provide means for raising the belt just as soon as the vacuum is destroyed, so that it will not rub over said casing, in the shape of projections 56, arranged on either side of the frame of the machine above the surface of the plates 31, one on either side of the casing of the vacuum-chamber. These projections may be of any suitable character, preferably having a rounded surface, and may be permanently or adjustably secured to the plates 31. They serve to keep the belt above the casing of the vacuum-chamber when it has been released from contact with the same after the vacuum has been destroyed.

In Figs. 5 and 6 I have shown modified forms of mechanism for depositing the icing or other material on the cakes. In these devices I employ an endless belt 57, adapted to receive a thin layer of the material with which the cakes are to be coated. This belt is adapted to guide pulleys 58 and a driving-pulley 59. This driving-pulley may be operated by pawl-and-ratchet mechanism similar to that for operating the feed-rolls in the icing-reservoir 7, as shown by Fig. 1. This structure is carried by a frame 60, adapted to be pivoted at 61 to the frame of the machine, and is given a rocking movement up and down from this pivot-point, so as to engage the cakes on the belt in the same manner as the feeding-head 8 and coat the same, the carrying-belt being operated and the cakes retained thereon in the manner already described with reference to Figs. 1, 2, 3, and 4. To insure the contact of the belt 57 with the cakes, I provide means for pressing this belt onto the cakes in the shape of an inflatable bag 62, located above the belt at the point where it comes in contact with the cakes. This bag is adapted to be filled with air, and when the belt 57 is lowered to coat the cakes the bag acts as a cushion, insuring the depositing of the material on the cakes, but preventing any injury to the same.

In the device shown in Fig. 6 the coating of the cakes is effected by the actual contact of the icing-belt 57 with the same, both the carrying-belt for the cakes and the icing-belt moving together at the same speed. When the icing-belt finishes its work, the cakes are carried on by the belt 2 and discharged therefrom in the ordinary manner, as already described. An inflatable bag 62 is also employed with this device. A suitable reservoir 63 for the material to coat the cakes by the devices shown in Figs. 5 and 6 is shown in dotted lines mounted above the same.

For the best working of my machine the cakes or crackers to be coated should have a perfectly-flat side to rest on the carrying-belt 2. If the cakes have a roughened or irregular surface, the vacuum will not hold them to the belt; but the exhausting of the air from the vacuum-chamber being kept up during the coating operation and as the feeding-head starts to rise will necessarily cause an inrush of air to the vacuum-chamber, and this inrushing air and the suction for the same will tend to hold the cakes to the belt by atmospheric pressure.

When it is desired to coat cakes of irregular size or shape, I prefer to place guards or retaining devices on the belt adjacent to the openings 13 in the same. Such forms of belt I have shown in Figs. 7, 8, 9, and 10. Fig. 7 is a plan view of a portion of a belt having guards 64, of angle metal, extending across the belt, and Fig. 8 is a cross-section of the same. Fig. 9 is a plan view of a portion of a belt which has in addition to the pieces extending across the belt short pieces 65, adjoining the pieces 64 and forming receptacles for the cakes over the openings 13 in the belt; and Fig. 10 is a sectional view of the same.

As it may be difficult to secure and maintain a perfect vacuum with a belt having large openings, I may provide groups of smaller openings 13ª, arranged at regular intervals in the belt—such, for instance, as are shown in Figs. 11 and 12. Fig. 11 is a plan view of a portion of a belt of this construction, and Fig. 12 is a sectional view of the same.

As the carrying-belt cannot help but retain crumbs of the cakes operated upon, as well as an occasional drop of the coating material, and as it is very desirable that it be as clean as possible to receive the cakes, I provide a brush 66, carried by suitable brackets 67, secured to the frame of the machine. This brush is located at such a point that the droppings will not interfere with the operation of the machine, and I preferably arrange a tray 68 beneath the brush to receive these droppings.

The operation of the machine is as follows: After properly charging the icing-reservoir, feeding the cakes to be coated to the carrying-belt, providing means for receiving the coated cakes, connecting the vacuum-chamber with the exhaust apparatus, and having the feeding-head in its elevated position the machine may be set in motion and the belt carrying the cakes begins to move forward. The cams 25, which control the movement of the feeding-head, are constructed so as to give a period of rest at each end of the stroke, with a quick up-and-down movement.

The rotation of the driving-shaft 5 during the period of rest of the feeding-head when in the elevated position actuates the rock-shaft 45, which serves to turn the ratchet-wheel 48 through the medium of the pawl 49 and link 51, turning the sprocket-wheels 4, moving the carrying-belt 2 forward, and bringing a row of cakes carried by the same directly under the discharge-tubes 14 of the feeding-head 8. The pawl-and-ratchet mechanism operating the feed-rolls in the icing-reservoir 7 are set in motion at the same time the carrying-belt 2 is moved, and the icing material is introduced into the delivery-passage 32, whence it passes into the feeding-head 8 when said head is in the elevated position. This feeding-head now descends, carrying with it the telescoping portion 26, and in its descent cuts off the flow of material from the delivery-passage 32 by means of the knife-edge 33 at the upper part of the feed-spout, and the opening of the passage 32 is covered by the portion of the feeding-head above the knife-edge. In the descent of the feeding-head the pins 30, carried by the telescoping lower portion of the same, come in contact with the plates 31 at the sides of the machine, said pins having been previously adjusted to the proper length to stop the further descent of the telescoping portion carrying the discharge-tubes 14. The feeding-head continuing to descend to its lowest point, it pushes into the portion 26 and compresses the material in said portion, and the tubes being at the proper distance above the cakes the icing or other material in the feeding-head is ejected onto the same. The rods 21, which carry the feeding-head down, have opened the valves 18 controlling the exhaust apparatus, and when these rods are in their lowermost position a vacuum is created in the chamber 16 and the cakes are firmly held to the belt. A sufficient quantity of the material having been placed on the cakes, the feeding-head will now be carried up and the connection between the material in the same and that on the cakes will be broken, because the cakes are held to the belt. As the telescoping portion of the feed-spout is returned to its normal position by the springs 27, the material which has projected from the discharge-tubes 14 after the cakes have been coated will be drawn into the same and kept therein until the feeding-head descends to coat the next series of cakes.

The communication between the vacuum-chamber and the exhaust apparatus is maintained until the feeding-head reaches its extreme upper position, when it is cut off and the atmospheric pressure is restored, leaving the cakes resting loosely on the carrying-belt 2 and ready to be moved forward to drop into the boxes carried by the delivery-belt.

During the rest of the feeding-head, between its descent and its upward movement, the mechanism for moving the carrying-belt and that for operating the feed-rolls in the icing-reservoir have assumed a position ready to move the carrying-belt forward to bring another row of cakes into position to be coated as soon as the belt is released from the vacuum-chamber.

Having thus described my invention, I claim and desire to secure by Letters Patent—

1. In a machine of the character described, the combination of the frame, a carrying-belt adapted to carry cakes, means for coating said cakes, and means for holding said cakes to the belt.

2. In a machine of the character described, the combination of the frame, a moving carrying-belt adapted to carry cakes, means for coating the cakes with a semifluid plastic mixture, and means for positively holding the cakes to the belt during the coating operation.

3. In a machine of the character described, the combination of the frame, a moving carrying-belt adapted to carry cakes, an icing-reservoir, means for ejecting the icing carried by said reservoir onto the cakes, and means for positively holding said cakes during the coating operation.

4. In a machine of the character described, the combination of the frame, a moving carrying-belt adapted to carry cakes, an icing-reservoir, a sliding feeding-head carried by the same, and means for reciprocating said head up and down to deposit the icing on the cakes.

5. In a machine of the character described, the combination of the frame, a moving carrying-belt adapted to carry cakes, an icing-reservoir, a sliding feeding-head carried by the same, means for reciprocating said head up and down to deposit the icing on the cakes, and means for positively holding said cakes to the belt during the coating operation and while the feeding-head is being raised.

6. In a machine of the character described, the combination of the frame, sprocket-wheels mounted thereon, a moving carrying-belt adapted to said sprocket-wheels and carrying cakes, an icing-reservoir, a feeding-head carried by the same, means for moving the belt so as to bring the cakes carried by the same in the proper position beneath the feed-spout to be coated, and means for lowering the feeding-head to coat the cakes.

7. In a machine of the character described, the combination of the frame, a moving carrying-belt adapted thereto having a series of openings arranged at regular intervals in the same and having cakes disposed over said openings, means for coating said cakes, a vacuum-chamber located beneath said belt and having an opening registering with the holes in the belt, and means for exhausting the air from the vacuum-chamber so as to hold the cakes to the belt during the coating operation.

8. In a machine of the character described, the combination of the frame, a moving carrying-belt adapted thereto having a series of openings arranged at regular intervals in the same and having cakes disposed over said openings, an icing-reservoir, a feeding-head carried thereby, a vacuum-chamber beneath the belt and located directly under the feeding-head of the icing-reservoir, means for lowering said feeding-head to coat the cakes, and means for exhausting the air from the vacuum-chamber so as to hold the cakes to the belt during the coating operation and as the feeding-head is raised.

9. In a machine of the character described, the combination of the frame, a moving carrying-belt adapted thereto having a series of openings arranged at regular intervals in the same and having cakes disposed over said openings, an icing-reservoir, a feeding-head carried thereby, a vacuum-chamber beneath the belt and located directly under the feeding-head of the icing-reservoir, means for lowering said feeding-head to coat the cakes, and means for exhausting the air from the vacuum-chamber so as to hold the cakes to the belt during the coating operation and as the feeding-head is raised, the connection between said head and its operating means being connected to and controlling the means for exhausting the air from the vacuum-chamber.

10. In a machine of the character described, the combination of the frame, an icing-reservoir mounted above the same, a sliding feeding-head adapted to the front of said reservoir, means for moving said head up and down and guides secured to said reservoir in which the feeding-head travels.

11. In a machine of the character described, the combination of the frame, a carrying-belt adapted thereto, an icing-reservoir mounted above the carrying-belt, feed-rolls therein, a feeding-head carried by said reservoir, means for reciprocating said head up and down, and a communication between said icing-reservoir and the feeding-head, open to said head only when it is in the raised position.

12. In a machine of the character described, the combination of the frame, sprocket-wheels mounted thereon, a carrying-belt adapted thereto, an icing-reservoir mounted above the carrying-belt, feed-rolls therein, a feeding-head carried by said reservoir, means for reciprocating said head up and down, and means for operating the feed-rolls after the feeding-head has been elevated.

13. In a machine of the character described, the combination of a frame, a carrying-belt adapted thereto, an icing-reservoir mounted above the frame, a feeding-head carried thereby, a telescoping lower portion carried by said feeding-head, and discharge-tubes carried by said telescoping portion through which the material carried by the feeding-head is ejected.

14. In a machine of the character described, the combination of the frame, an icing-reservoir mounted above the same, a feeding-head carried by the icing-reservoir, a telescoping lower portion carried by said feeding-head, discharge-tubes therein, and means for limiting the movement of said telescoping portion of the feed-spout whereby the material carried by the feeding-head will be ejected through said discharge-tubes.

15. In a machine of the character described, the combination of the frame, an icing-reservoir mounted above the same, a feeding-head carried by the icing-reservoir, a telescoping lower portion carried by said feeding-head, means for reciprocating said head up and down, and means for limiting the downward movement of the telescoping portion independent of the movement of the feeding-head whereby the material carried by the same will be ejected.

16. In a machine of the character described, the combination of the frame, an icing-reservoir carried thereby and mounted above the same, a feeding-head carried by the icing-reservoir, a telescoping lower portion carried by said feeding-head, means for limiting the movement of said telescoping portion whereby the material carried therein will be ejected, and means for returning said telescoping portion to its normal position.

17. In a machine of the character described, the combination of the frame, an icing-reservoir mounted above the same, a table secured to the frame, a sliding feeding-head carried by the icing-reservoir, a telescoping portion carried by the feeding-head, discharge-tubes carried by said telescoping portion, and a series of adjustable pins carried by the bottom plate of said telescoping portion and adapted to engage the table of the frame, thereby limiting the descent of the telescoping portion and causing the icing to be ejected through the discharge-tubes carried thereby.

18. In a machine of the character described, the combination of the frame, the carrying-belt adapted thereto, an icing-reservoir mounted above the frame, a sliding feeding-head carried by the icing-reservoir, means for reciprocating said head up and down, a delivery-passage from the icing-reservoir to the feeding-head, and provision for cutting off the discharge from this passage when the feeding-head is in the lowered position.

19. In a machine of the character described, the combination of the frame, a moving carrying-belt adapted thereto, cakes carried thereby, an icing-reservoir, a feeding-head carried by said reservoir, means for raising and lowering said head, means for moving said carrying-belt intermittently, the forward movements of said belt being coincident with the upward movement of the feeding-head, substantially as and for the purpose set forth.

20. In a machine of the character described, the combination of the frame, a moving carrying-belt adapted thereto, cakes carried thereby, an icing-reservoir mounted above said frame, a sliding feeding-head carried by said reservoir, a driving-shaft, cams carried by said shaft, and a connection between said cams and the feeding-head whereby the latter is reciprocated up and down by the rotation of the driving-shaft.

21. In a machine of the character described, the combination of the frame, a moving carrying-belt adapted thereto, cakes carried thereby, an icing-reservoir carried by suitable supports mounted on the frame, a sliding feeding-head carried by said reservoir, vertical rods secured to and serving to raise and lower said head, a driving-shaft, and cams carried by said shaft and adapted to engage the rods carried by the feeding-head whereby a reciprocating movement is imparted to said head substantially as described.

22. In a machine of the character described, the combination of the frame, a moving carrying-belt adapted thereto, cakes carried thereby, an icing-reservoir carried by suitable supports mounted on the frame, a sliding feeding-head carried by said reservoir, vertical rods secured to and serving to raise and lower said head, yokes carried by the lower ends of said rods, a driving-shaft, and cams carried by said shaft and adapted to engage the yokes carried by said vertical rods whereby a positive up-and-down movement is imparted to the feeding-head, substantially as described.

23. In a machine of the character described, the combination of the frame, an apertured carrying-belt adapted thereto, cakes carried thereby, a vacuum-chamber located beneath the belt, and means for exhausting the air from said vacuum-chamber whereby the cakes will be held to the belt at certain periods of their travel on the same.

24. In a machine of the character described, the combination of the frame, a carrying-belt adapted thereto, cakes carried thereby, a vacuum-chamber located beneath the belt, means for exhausting the air from said chamber so as to hold the cakes to the belt, and projections carried by the frame at the side of the belt for elevating the same as it passes over the casing of the vacuum-chamber before and after the vacuum has been created.

25. In a machine of the character described, the combination of the frame, an apertured carrying-belt adapted thereto, cakes carried thereby and adapted to rest over the apertures in the belt, an icing-reservoir, a sliding feeding-head carried by the same, rods for moving said feeding-head up and down, a vacuum-chamber carried by the frame of the machine and located beneath the belt directly under the feeding-head, means for exhausting the air from the vacuum-chamber so as to hold the cakes to the belt, valves controlling this means, and a cross-bar carried by the rods which move the feeding-head up and down, serving to operate said valves.

26. In a machine of the character described, the combination of the frame, an apertured carrying-belt adapted thereto, cakes carried thereby, and guards or securing devices mounted on the belt and serving to hold the cakes in their proper place over the apertures in the same.

27. In a machine of the character described, the combination of the frame, an apertured carrying-belt adapted thereto, cakes carried thereby, transverse guards secured to the face of said belt, and short guards arranged at right angles to the transverse guards and forming pockets for the cakes whereby they are held in their proper places over the apertures in the belt.

In testimony whereof I have signed my name to this specification in the presence of two subscribing witnesses.

PEMBROKE D. HARTON.

Witnesses:
MURRAY C. BOYER,
JOS. H. KLEIN.